United States Patent
Zinser, Jr. et al.

(10) Patent No.: US 7,715,404 B2
(45) Date of Patent: May 11, 2010

(54) METHOD AND APPARATUS FOR CONTROLLING A VOICE OVER INTERNET PROTOCOL (VOIP) DECODER WITH AN ADAPTIVE JITTER BUFFER

(75) Inventors: Richard L. Zinser, Jr., Niskayuna, NY (US); Martin W. Egan, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 355 days.

(21) Appl. No.: 11/940,505

(22) Filed: Nov. 15, 2007

(65) Prior Publication Data

US 2009/0132244 A1 May 21, 2009

(51) Int. Cl.
*H04L 12/28* (2006.01)
*H04L 12/56* (2006.01)
*H04J 3/24* (2006.01)

(52) U.S. Cl. ........................... 370/394; 370/474
(58) Field of Classification Search ................. None
See application file for complete search history.

(56) References Cited

U.S. PATENT DOCUMENTS

| | | | |
|---|---|---|---|
| 6,067,511 A | 5/2000 | Grabb et al. | |
| 6,073,093 A | 6/2000 | Zinser, Jr. et al. | |
| 6,078,880 A | 6/2000 | Zinser, Jr. et al. | |
| 6,081,776 A | 6/2000 | Grabb et al. | |
| 6,081,777 A | 6/2000 | Grabb | |
| 6,094,629 A | 7/2000 | Grabb et al. | |
| 6,098,036 A | 8/2000 | Zinser, Jr. et al. | |
| 6,119,082 A | 9/2000 | Zinser, Jr. et al. | |
| 6,138,092 A | 10/2000 | Zinser, Jr. et al. | |
| 7,433,358 B1* | 10/2008 | Volkaerts et al. ............. 370/394 |
| 2002/0150069 A1* | 10/2002 | Jou et al. .................... 370/335 |
| 2006/0104314 A1* | 5/2006 | Miyaji et al. ................ 370/521 |
| 2007/0060166 A1 | 3/2007 | Kitamura et al. | |
| 2007/0121597 A1 | 5/2007 | Lee et al. | |
| 2007/0127466 A1* | 6/2007 | Seon ........................... 370/389 |
| 2007/0186146 A1 | 8/2007 | Lakaniemi et al. | |

OTHER PUBLICATIONS

International Search Report for related application No. PCT/US2008/083298; dated Dec. 29, 2008.
http://www.globalipsound.com/datasheets/NetEQ.pdf.
ITU-T Recommendation G.729, International Telecommunications Union, Mar. 1996, pp. 31-32.
ITU-T Recommendation G.729 Annex D, International Telecommunications Union, Sep. 1998, p. 3.
ITU-T Recommendation G.729 Annex E, International Telecommunications Union, Sep. 1998, pp. 17-18.
ITU-T Recommendation G.711 Appendix I, International Telecommunications Union, Sep. 1999.

* cited by examiner

*Primary Examiner*—Chirag G Shah
*Assistant Examiner*—Ashley L Shivers
(74) *Attorney, Agent, or Firm*—Ronald E. Prass, Jr.; Prass LLP (57) ABSTRACT

A method and apparatus that controls a Voice over Internet Protocol (VoIP) decoder in a communication device is disclosed. The method may include determining if a packet has been received, and if a packet has been received, determining if a receive error has occurred, and if a receive error has not occurred, setting a counter that counts a number of sequential bad frames to a value of zero, decoding the received packet, and sending the decoded packet to an audio queue for presentation to a user of the communication device.

15 Claims, 7 Drawing Sheets

METHOD AND APPARATUS FOR CONTROLLING A VOICE OVER INTERNET PROTOCOL (VOIP) DECODER WITH AN ADAPTIVE JITTER BUFFER

BACKGROUND OF THE DISCLOSURE

1. Field of the Disclosure

The disclosure relates to Voice over Internet Protocol (VoIP) telephone communications.

2. Introduction

In a digital telephonic communication system, VoIP packets are usually sent using a "fire and forget" protocol such as User Datagram Protocol (UDP) or User Datagram Protocol/ Realtime Transport Protocol (UDP/RTP). UDP has no retransmission (nor any other error control mechanism) to fix errors or replace lost packets. In fact, UDP packet delivery is not guaranteed, and packets may be dropped when a network becomes congested. Thus, the main cause of voice quality degradation in VoIP systems arises from lost and late (or misordered) packets. If these packets are fed to an unprotected voice decoder, it is possible that gaps, additional delay, and garbled speech can result.

SUMMARY OF THE DISCLOSURE

A method and apparatus that controls Voice over Internet Protocol (VoIP) communications in a communication device is disclosed. The method may include determining if a packet has been received, and if a packet has been received, determining if a receive error has occurred, and if a receive error has not occurred, setting a counter that counts a number of sequential bad frames to a value of zero, decoding the received packet, and sending the decoded packet to an audio queue for presentation to a user of the communication device.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure. This disclosure concerns a method and apparatus for controlling a Voice over Internet Protocol (VoIP) decoder with an adaptive jitter buffer to produce improved voice quality. The VoIP decoder controller may detect lost, misordered, or delayed packets, and may optimally choose a mitigation path based on the state of the VoIP decoder. The jitter buffering may be done primarily in the audio buffer or queue, and the depth of the queue may be set according to the variability of the packet inter-arrival time. Finally, the VoIP decoder controller 280 may automatically compensate for differences in the audio sampling clock in the VoIP encoder and decoder.

In the description set forth below, some system parameters must be defined and characteristics for the VoIP system to which it is to be applied. (1) When there is voice activity present at the VoIP encoder, the encoder may transmit packets at a regular time interval, called the "frame time". (2) When there is no voice activity at the encoder, there may be no voice packets transmitted. (3) When transitioning from a state of voice activity to no voice activity, a "comfort noise" packet may be transmitted which instructs the voice decoder to generate background noise (e.g. comfort noise frames) until voice activity is resumed. (4) A sequence number may be transmitted with each VoIP packet indicating the transmission order. This number may be as small as 8 bits, depending on the worst-case network conditions. (5) Either (a) the speech decoder may have a built-in algorithm for regenerating a lost frame of speech (fill frame), or b) a method (such as the ITU Recommendation G.711 Appendix 1 (which is independent of vocoder type)) may be employed for fill frame generation. (6) The current depth of the audio buffer must be known (e.g. the number of audio frames that have been decoded and are ready for playback).

This disclosure presents a method and apparatus for comprehensively dealing with misplaced packets in a VoIP system. Misplaced packets may be detected by two mechanisms: (1) a packet is not available within a specified time limit (based on the frame time) after reception of the last packet (called a timeout error); and (2) one or more packets are truly missing, as indicated by missing sequence number(s) after any reordering of the receiver packet buffer. Note that a timeout error may precede a missing sequence error, and the two indications may refer to the same error.

The VoIP decoder controller may perform the following in its control function:

1. If a received packet is available, and the sequence number is correct, immediately decode the packet and queue the decoded audio in the playback buffer.
2. If the sequence number is not correct, increment the consecutive bad frame counter (dcount) and proceed with the mismatched sequence number processing.
3. If a timeout is detected, proceed with the timeout processing.
4. Sleep for 1 msec and repeat the above.

Note that because of step (1) above, most of the jitter mitigation takes place in the audio, rather than the packet buffer. Because of this, the queue depth of the output audio buffer (OQD) is critically important and is updated continuously and made available to all routines in the process.

Figure 1:
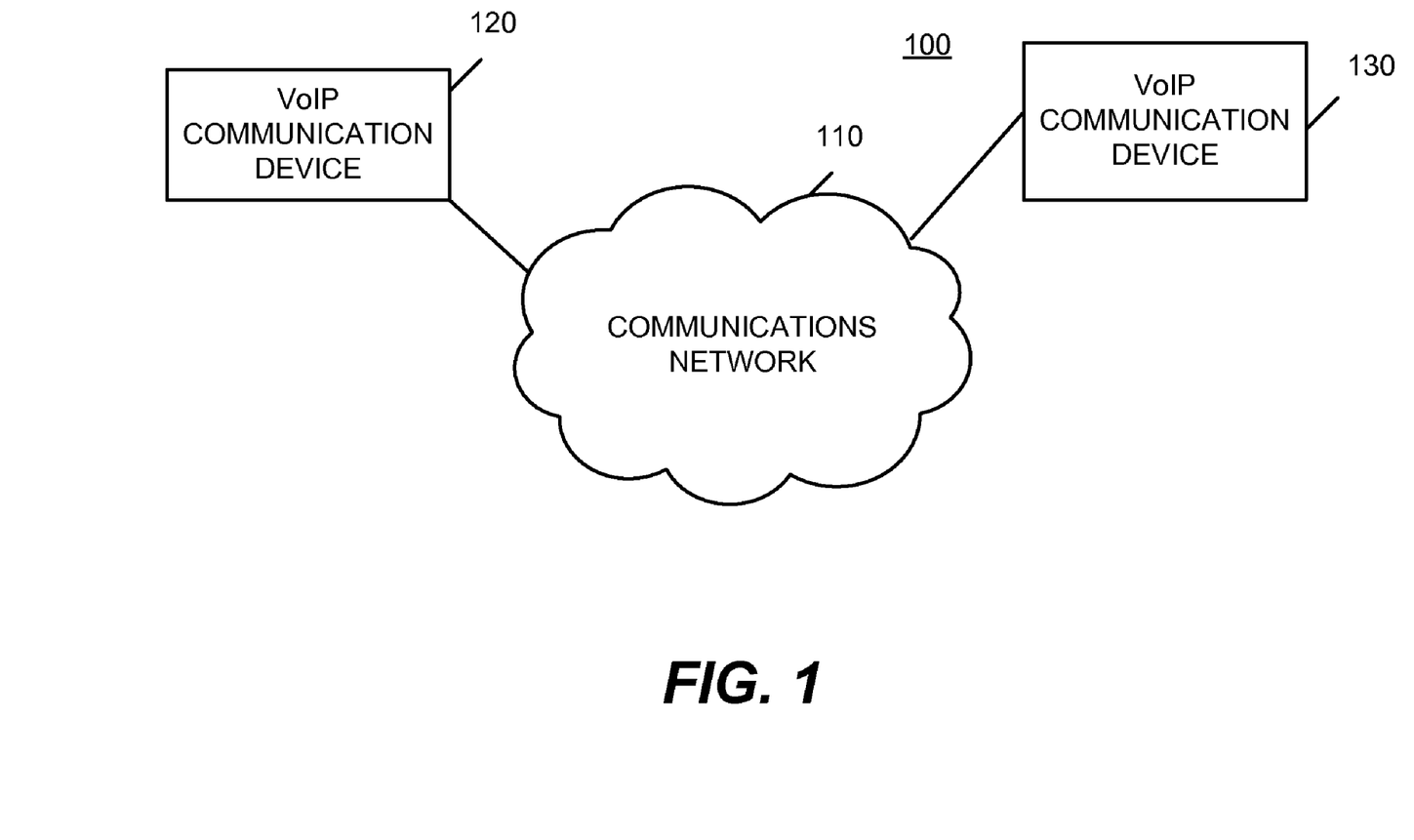
FIG. 1 illustrates an exemplary diagram of a VoIP communications network environment in accordance with a possible embodiment of the disclosure.

FIG. 1 illustrates an exemplary diagram of a VoIP communications network environment 100 in accordance with a possible embodiment of the disclosure. The VoIP communications network environment 100 may include a plurality of VoIP communication devices 120, 130 connected through a communications network 110.

Communications network 110 may represent any possible communications network that may handle VoIP telephonic communications, including wireless telephone networks, hardwired telephone networks, wireless local area networks (WLAN), the Internet, an intranet, etc., for example.

The VoIP communication device 120, 130 may represent any VoIP device capable of telephonic communications, including a telephone, server, personal computer, Voice over Internet Protocol (VoIP) telephone, etc., for example. Although only two VoIP communication devices 120, 130 is shown this is merely illustrative. There may be a any number of VoIP communication devices 120, 130 in the VoIP communications network environment 100.

Figure 2:
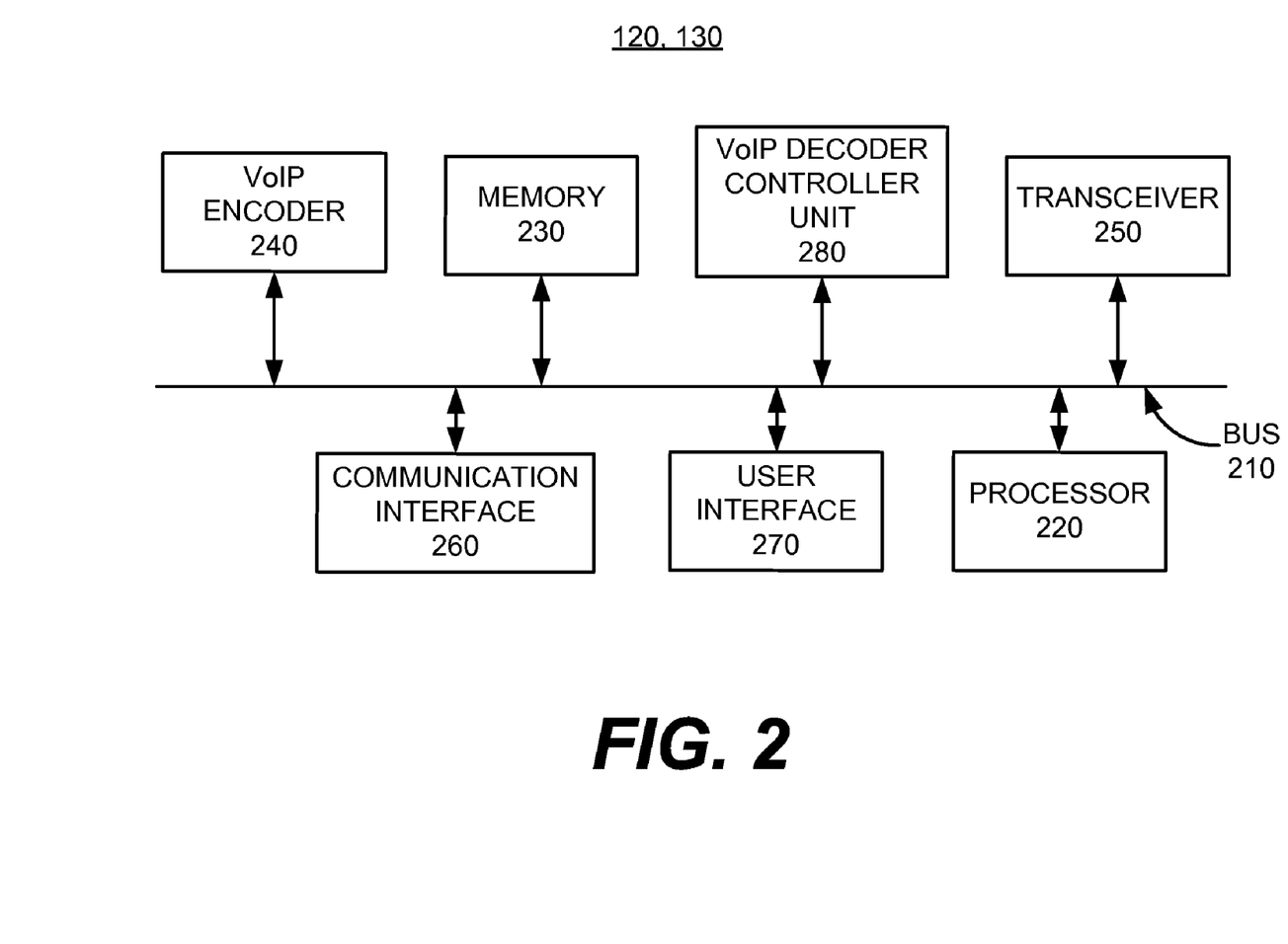
FIG. 2 illustrates a block diagram of an exemplary VoIP communication device in accordance with a possible embodiment of the disclosure.

FIG. 2 illustrates a block diagram of an exemplary VoIP communication device 120, 130 in accordance with a possible embodiment of the disclosure. The exemplary VoIP communication device 120, 130 may include a bus 210, a processor 220, a memory 230, a VoIP encoder 240, a transceiver 250, a communication interface 260, a user interface 270, and a VoIP decoder controller unit 280. Bus 210 may permit communication among the components of the VoIP communication device 120, 130.

Processor 220 may include at least one conventional processor or microprocessor that interprets and executes instructions. Memory 230 may be a random access memory (RAM or another type of dynamic storage device that stores information and instructions for execution by processor 220. Memory 230 may also include a read-only memory (ROM which may include a conventional ROM device or another type of static storage device that stores static information and instructions for processor 220.

VoIP Encoder 240 may provide the means to convert an incoming digital audio stream into bits suitable for assembly into packets for transmission through transceiver 250 or communication interface 260.

Transceiver 250 may include one or more transmitters and receivers. The transceiver 250 may include sufficient functionality to interface with any network or communications station and may be defined by hardware or software in any manner known to one of skill in the art. The processor 220 is cooperatively operable with the transceiver 250 to support operations within the communications network 110. In a wireless communication device 120, the transceiver 250 may transmit and receive transmissions directly or wirelessly via one or more of antennae, for example, in a manner known to those of skill in the art.

Communication interface 260 may include any mechanism that facilitates communication via the communications network 110. For example, communication interface 260 may include a modem. Alternatively, communication interface 260 may include other mechanisms for assisting the transceiver 250 in communicating with other devices and/or systems via wireless or hardwired connections.

User interface 270 may include one or more conventional input mechanisms that permit a user to input information, communicate with the VoIP communication device 120, 130 and/or present information to the user, such as a an electronic display, microphone, touchpad, keypad, keyboard, mouse, pen, stylus, voice recognition device, buttons, one or more speakers, etc.

The VoIP communication device 120, 130 may perform such functions in response to processor 220 and by executing sequences of instructions contained in a computer-readable medium, such as, for example, memory 230. Such instructions may be read into memory 230 from another computer-readable medium, such as a storage device or from a separate device via communication interface 260.

The operations and functions of the VoIP decoder controller unit 280 will be discussed in relation to FIGS. 3-7.

Figure 3:
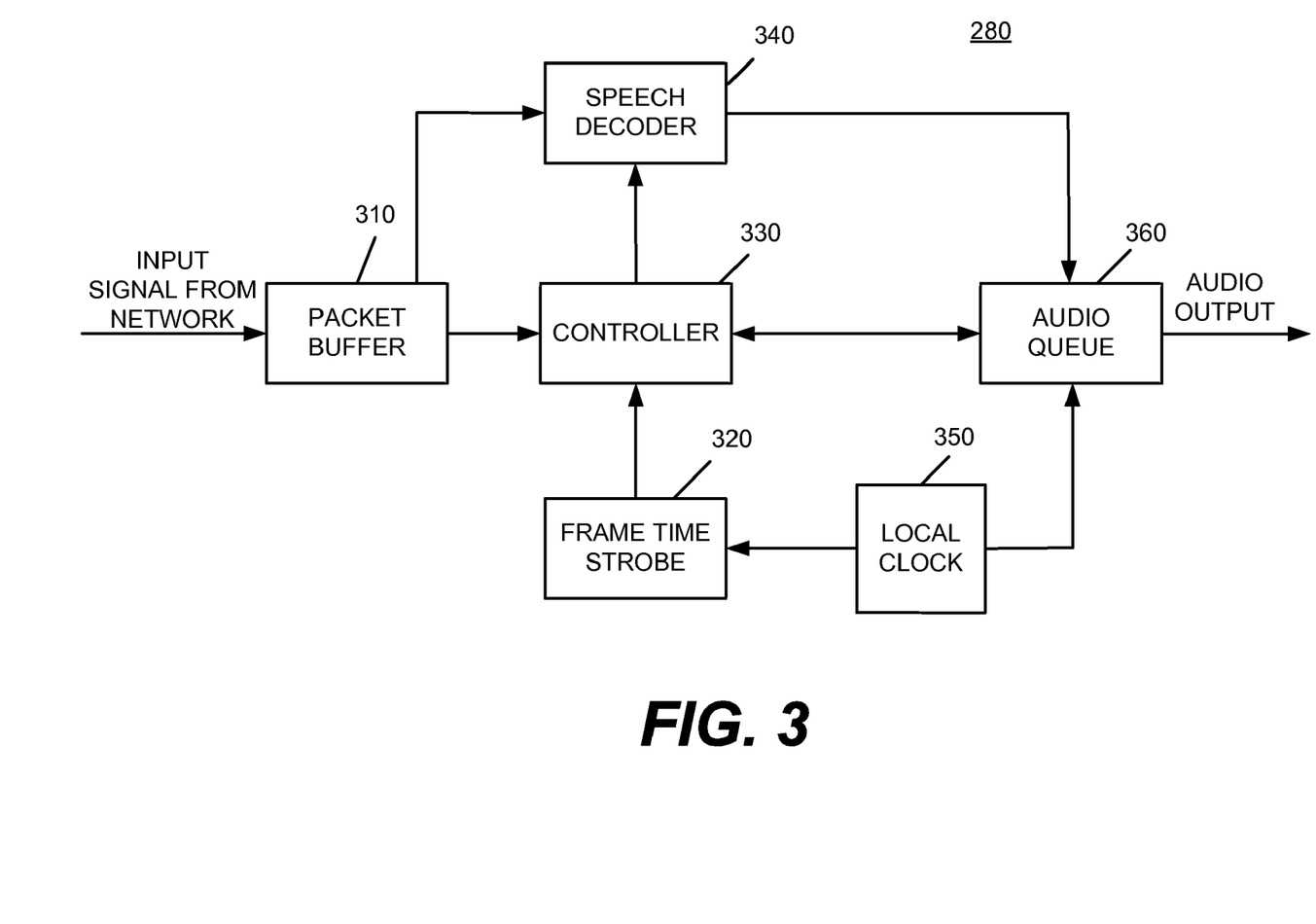
FIG. 3 illustrates an exemplary block diagram of a VoIP decoder controller unit in accordance with a possible embodiment of the disclosure.

FIG. 3 illustrates an exemplary block diagram of a VoIP decoder controller unit 280 in accordance with a possible embodiment of the disclosure. The VoIP decoder controller unit 280 may include packet buffer 310, frame time strobe 320, controller 330, speech decoder 340, local clock 350, and audio queue 360.

The controller 330 may represent any processor, control logic, control software, control algorithm, etc. that may able to control the operations of the VoIP decoder controller unit 280. In this manner, the controller 330 may receive input from the packet buffer 310 signaling that a packet has been received from the network and its sequence number. The controller may 330 then signal the speech decoder 340 to decode the received packet in accordance with timing signals from frame time strobe 320 and local clock 350. The speech decoder 340 may then send the audio from the decoded packet to the audio queue 360. The decoded audio may be output to the user of the VoIP communication device 120, 130 upon receiving a signal from the controller 330.

The local clock 350 also sends timing signals to the audio queue 360. The controller 330 also computes audio queue depth based on the audio queue depth information received from the audio queue 360.

The speech decoder 340 may represent any speech decoder know to one of skill in the art. The packet buffer 310 and the audio queue 360 may be any storage device, register, memory, etc. known to one of skill in the art.

For illustrative purposes, the operations of the VoIP decoder controller 280 and the VoIP decoder controller process will be described below in the discussion of FIGS. 4-7 in relation to the diagrams shown in FIGS. 1-3, above.

Figure 4:
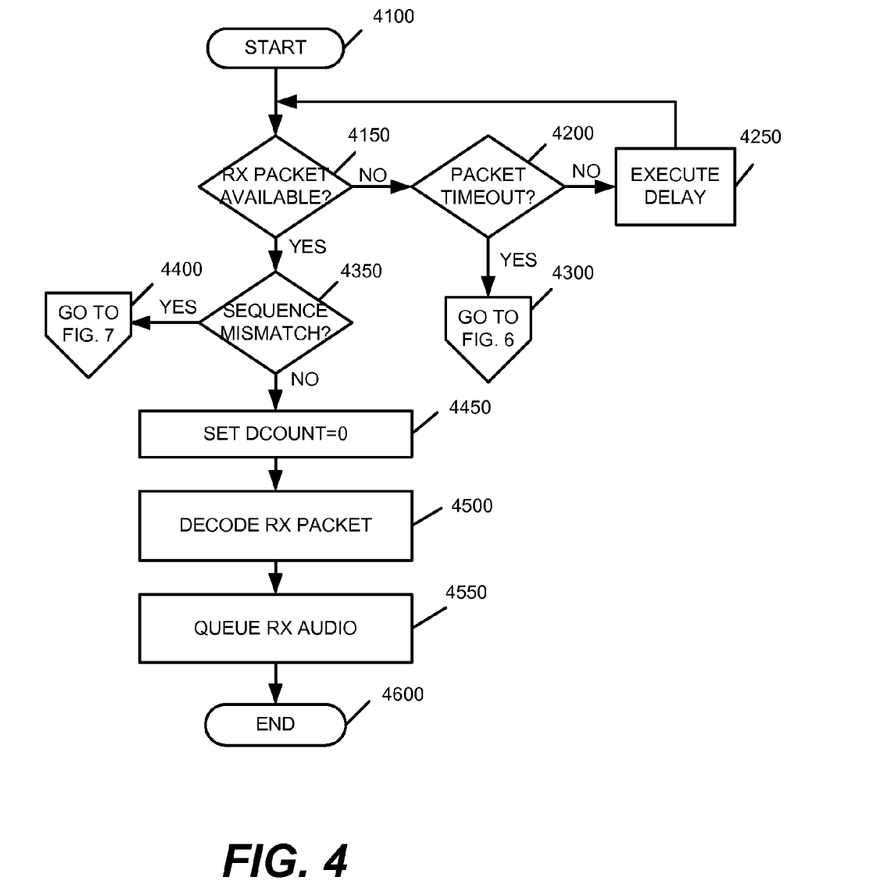
FIG. 4 is an exemplary flowchart illustrating a possible process for controlling a Voice over Internet Protocol (VoIP) decoder in a communication device in accordance with one possible embodiment of the disclosure.

FIG. 4 is an exemplary flowchart illustrating a possible process for controlling a VoIP decoder in a communication device in accordance with one possible embodiment of the disclosure. The process begins at step 4100 and continues to step 4150, where the VoIP decoder controller 280 may determine if a packet has been received (or available). If the VoIP decoder controller 280 determines that a packet has not been received, then at step 4200, the VoIP decoder controller 280 may determine if a receive error has occurred, such as a packet timeout. If the VoIP decoder controller 280 determines that a packet timeout has occurred, then at step 4300, the process goes to step 4300 and may execute the process described below in relation to FIG. 6 (lost packet mitigation).

If the VoIP decoder controller 280 determines that a packet timeout has not occurred, then the process goes to step 4250 where the VoIP decoder controller 280 may execute a delay. To execute this delay, the VoIP decoder controller 280 may use a delay loop and the delay may be 1 msec, for example. This delay allows the processor 220 or controller 330 time to execute other tasks. The process then returns to step 4150.

If at step 4150, the VoIP decoder controller 280 determines that a packet has been received, then at step 4350, the VoIP decoder controller 280 may determine if another type of receive error has occurred, such as a sequence number mismatch. If the VoIP decoder controller 280 determines that a sequence number mismatch has occurred, then at step 4400, the process may execute the process set forth below in relation to FIG. 7 (another receive packet mitigation process).

It at step 4350, the VoIP decoder controller 280 determines that a sequence number mismatch has not occurred, then at step 4450 the VoIP decoder controller 280 may set a counter that counts the number of bad sequential bad frames ("dead" frames) to a value of zero. At step 4500, the VoIP decoder controller 280 may decodes the received packet. At step 4550, the VoIP decoder controller 280 may store the decoded packet in the audio queue 360. The process then goes to step 4600, and ends.

Figure 5:
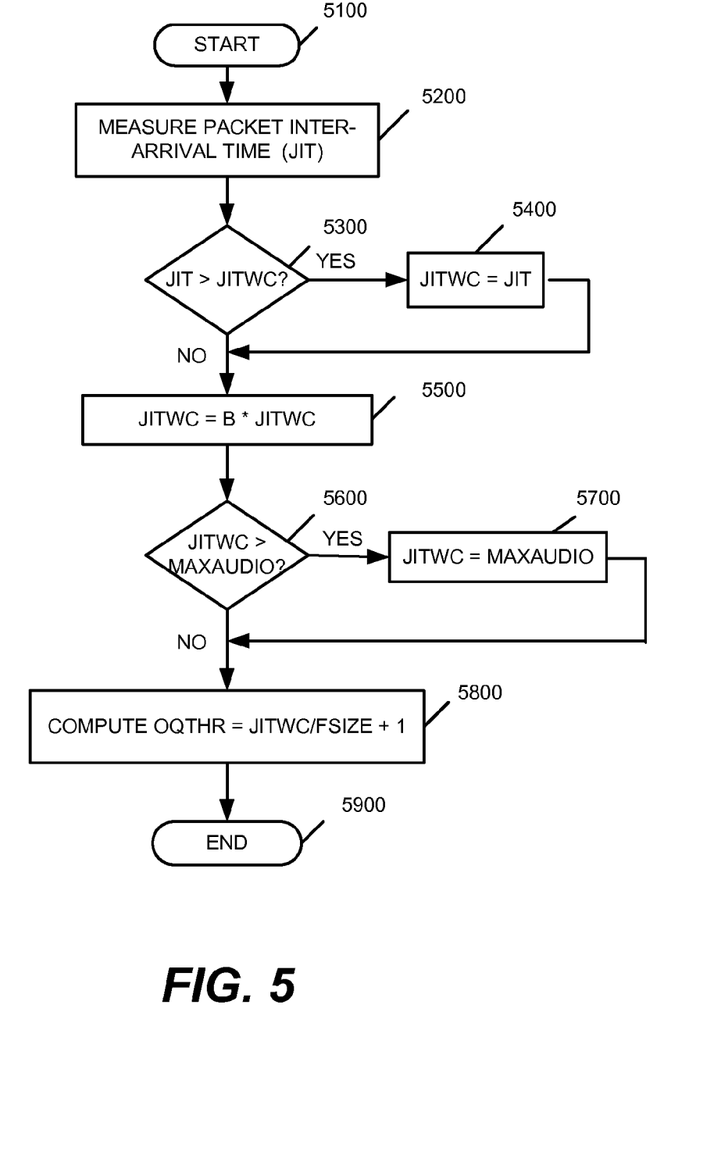
FIG. 5 is an exemplary flowchart illustrating a possible process for controlling audio queue depth in accordance with one possible embodiment of the disclosure.

FIG. 5 is an exemplary flowchart illustrating a possible process for controlling audio queue depth in accordance with one possible embodiment of the disclosure. This process sets an adaptive target for the audio queue (or buffer) depth (OQTHR); subsequent portions of the overall process will function to move the actual queue depth toward this target. The process is run after each packet is received from the network.

The process begins at step 5100 and continues to step 5200 where the VoIP decoder controller 280 may measure the packet inter-arrival time (JIT) (in msec, for example). At step 5300, the VoIP decoder controller 280 may determine if packet inter-arrival time measurement is greater than the time value in the worst-case jitter register (JITWC). If packet inter-arrival time measurement is greater than the time value in the worst-case jitter register, then the process goes to step 5400 where the VoIP decoder controller 280 may set (or overwrite) the worst-case jitter register value to the packet inter-arrival time measurement value. The process then proceeds to step 5500.

If at step 5300, the VoIP decoder controller 280 determines that packet inter-arrival time measurement is not greater than the value in the worst-case jitter register, then the process proceeds to step 5500 where the VoIP decoder controller 280 may set the worst-case jitter register to a value equal to a value equal to the worst-case jitter register value multiplied by a decay factor Beta ($\beta$ or B). Beta must have a value less than 1.0. For example, one embodiment may employ a value of 0.998 for a frame size of 20 msec. The use of this decay factor will gradually return the queue depth to its minimal setting if the jitter stops.

At step 5600, the VoIP decoder controller 280 may determine if packet inter-arrival time measurement is greater than the physical depth of the audio queue (MAXAUDIO) (in msecs, for example). If the VoIP decoder controller 280 determines that the value in the worst-case jitter register is greater than the physical depth of the audio queue, then the process proceeds to step 5700 where the VoIP decoder controller 280 may set the worst-case jitter register value equal to the value of the physical depth of the audio queue. The process then proceeds to step 5800.

If at step 5600, the VoIP decoder controller 280 determines that packet inter-arrival time measurement was not greater than the physical depth of the audio queue, than the process proceeds to step 5800 where the VoIP decoder controller 280 may compute the target audio output queue depth (OQTHR). The target audio queue depth may be computed by dividing the value of the worst-case jitter register by the depth (or size) of the speech frame (FSIZE) (in msec, for example) plus a value of one. The process then goes to step 5900, and ends.

Figure 6:
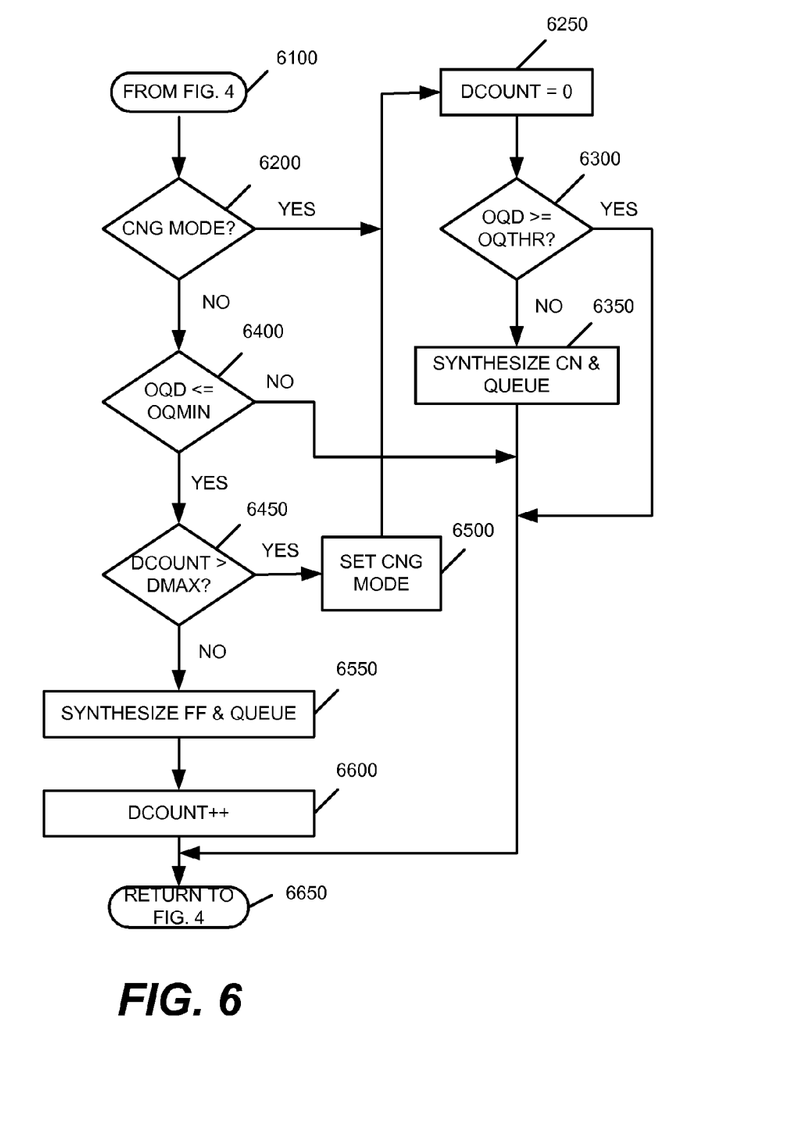
FIG. 6 is an exemplary flowchart illustrating a possible process for handling a packet timeout in accordance with one possible embodiment of the disclosure.

FIG. 6 is an exemplary flowchart illustrating a possible process for handling a packet timeout in step 4300 from FIG. 4 in accordance with one possible embodiment of the disclosure. The route taken through the flowchart is dependent on the present state of the decoder, for example.

The process begins at step 6100 and continues to step 6200 where the VoIP decoder controller 280 may determine if the comfort noise generation (CNG) mode is set and that comfort noise is being generated. If the VoIP decoder controller 280 determines that the comfort noise generation mode is set, then the process goes to step 6250 where the VoIP decoder controller 280 may set the counter for number of sequential bad frames to a value of zero (reset).

At step 6300, the VoIP decoder controller 280 may determine if the output queue depth (OQD) is greater than or equal to the target output queue depth (OQTHR). If the VoIP decoder controller 280 determines that output queue depth is greater than or equal to the target output queue depth, then the process goes to step in 6650 and returns to FIG. 4. Thus, another comfort noise frame is not generated which causes the audio queue depth to shrink towards the target value.

If at step 6300, the VoIP decoder controller 280 determines that the output queue depth is not greater than or equal to the target output queue depth, then the process proceeds to step 6350 where the VoIP decoder controller 280 may synthesize the comfort noise frame and the synthesized frame is added to the audio queue 360. The process then goes to step 6650 and returns to FIG. 4.

If at step 6200, the VoIP decoder controller 280 determines that the comfort noise generation mode is not set, the process goes to step 6400 where the VoIP decoder controller 280 may determine if the output queue depth (OQD) is less than or equal to the minimum output queue depth (OQMIN). In one possible embodiment, the minimum output queue depth may be set to a value of two. If the VoIP decoder controller 280 determines that the output queue depth is not greater than or equal to the minimum output queue depth, the process goes to step 6650 and returns to FIG. 4. Thus, the output queue effectively shrinks towards OQMIN.

If at step 6400, the VoIP decoder controller 280 determines that the output queue depth is less than or equal to be minimum output queue depth, the process proceeds to step 6450 where the VoIP decoder controller 280 may determine if the number of sequential bad (or "dead") frames is greater than the maximum number of bad frames. If the VoIP decoder controller 280 determines that the number of sequential bad frames is greater than the maximum number of sequential bad frames allowed, process proceeds to step 6500 where the VoIP decoder controller 280 may set the comfort noise generation mode so that comfort noise is generated. The process then proceeds to step 6250 which proceeds as discussed above.

If at step 6450, the VoIP decoder controller 280 determines that the number of sequential bad frames is not greater than the number of bad frames allowed, then the process proceeds to step 6550 where the VoIP decoder controller 280 may synthesize a fill frame (e.g. the best guess of what the real speech frame was) and store the synthesized fill frame in the audio queue 360. The fill frame may be generated either by the vocoder decoder or by an algorithm such as the G.711 Appendix 1 method, for example. At step 6600, the VoIP decoder controller 280 may increment the counter for the number of sequential bad frames. The process then goes to step 6650 and returns to FIG. 4.

Figure 7:
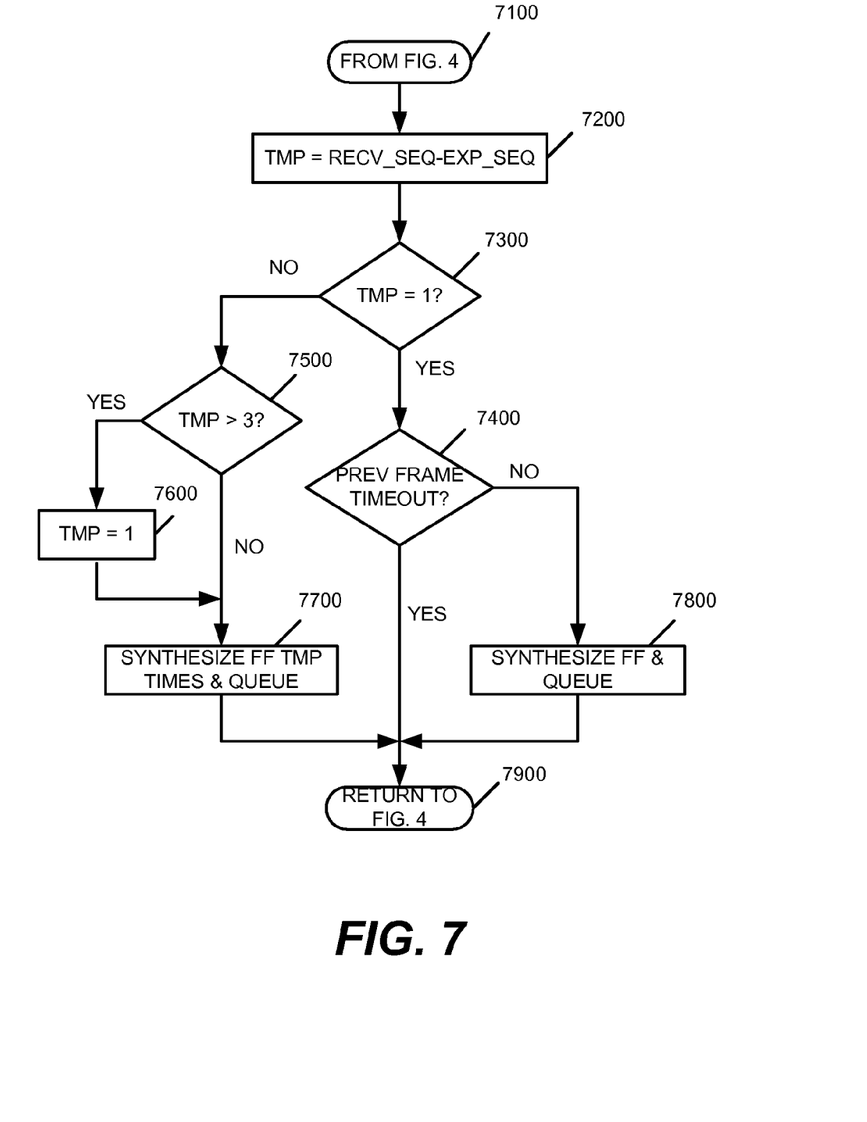
FIG. 7 is an exemplary flowchart illustrating a possible process for handling mismatched sequence numbers in accordance with one possible embodiment of the disclosure.

FIG. 7 is an exemplary flowchart illustrating a possible process for handling mismatched sequence numbers in step 4400 from FIG. 4 in accordance with one possible embodiment of the disclosure. The process begins at step 7100 and continues to step 7200 where the VoIP decoder controller 280 may estimate the number of consecutive frames lost by setting the temporary register value to the value equal to the received sequence number minus the expected sequence number.

At step 7300, the VoIP decoder controller 280 may determine if the value stored in the temporary register equals one. If the VoIP decoder controller 280 determines that the temporary register value does not equal one, the process proceeds to step 7500 where the VoIP decoder controller 280 may determine if the value stored in the temporary register is greater than three. If the VoIP decoder controller 280 determines that the temporary register value is greater than three, then the process goes to step 7600 where the VoIP decoder controller 280 may set the value of the temporary register to equal one as a loss of continuity is assumed. At step 7700, VoIP decoder controller 280 may synthesize a single fill frame and store it in the audio queue 360. The process then proceeds to step 7900 and returns to FIG. 4.

If at step 7500, VoIP decoder controller 280 determines that the temporary register is not greater than three, than the process proceeds to step 7700 where the VoIP decoder controller 280 may synthesize a number of fill frames equal to the value of stored in the temporary register. For example, if tmp=2, then two fill frames would be synthesized.

If at step 7300, the VoIP decoder controller 280 determines that the temporary register is equal to one, than the process proceeds to step 7400 where the VoIP decoder controller 280 may determine if the previous frame timed out. If the VoIP decoder controller 280 determines that the previous frame has timed out, than the process proceeds to step 7900 and returns to FIG. 4 as the error would have been mitigated by the timeout process discussed above in relation to FIG. 6.

If at step 7400 the VoIP decoder controller 280 determines that the previous frame has not timed out, than the process proceeds to step 7800 and synthesizes a single fill frame, which is subsequently stored in the audio queue 360. The process then proceeds to step 7900 and returns to FIG. 4.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the VoIP decoder controller unit 280 or it components in FIGS. 2-7 each processing the content in various possible ways. It does not necessarily need to be one system used by all end users. Accordingly, the appended claims and their legal equivalents should only define the disclosure, rather than any specific examples given.

We claim:

1. A method for controlling a Voice over Internet Protocol (VoIP) decoder in a communication device, comprising:
   determining if a packet has been received, and if a packet has been received,
   determining if a receive error has occurred, and if a receive error has not occurred,
   setting a counter that counts a number of sequential bad frames to a value of zero;
   decoding the received packet; and
   sending the decoded packet to an audio queue for presentation to a user of the communication device,
   wherein if the receive error is a timeout error and if a timeout error is determined to have occurred, the method further comprises:
     determining if comfort noise is being generated, wherein if comfort noise is being generated,
     resetting a bad frame counter to zero; and
     comparing an output audio queue depth to a target output audio queue depth, wherein if the output audio queue depth is less than the target output audio queue depth,
     generating a comfort noise frame, otherwise no comfort noise frame is generated,
     wherein if comfort noise is not being generated, the method further comprises:
       comparing an output audio queue depth to a minimum output audio queue depth, wherein if the output audio queue depth is equal to or less than the minimum output audio queue depth,
       determining if a consecutive bad frame counter is less than a maximum number of consecutive bad frames allowed, wherein if the consecutive bad frame counter is less than the maximum number of consecutive bad frames allowed,
generating a fill frame;
storing the fill frame in the audio queue; and
incrementing the consecutive bad frame counter.

2. The method of claim 1, wherein if a consecutive bad frame counter is not less than a maximum number of consecutive bad frames allowed, the method further comprises:
generating comfort noise frames; and
resetting the consecutive bad frame counter to zero.

3. The method of claim 1, wherein if the receive error is a mismatched sequence number error and if a mismatched sequence number error is determined to have occurred, the method further comprises:
determining a number of consecutive frames lost, wherein if the number of consecutive frames lost is equal to one,
determining if a previous frame had a timeout error wherein if the previous frame did not have a timeout error,
generating a fill frame; and
storing the fill frame in the audio queue.

4. The method of claim 3, wherein if the number of consecutive bad frames lost is more than one but not greater than three, the method further comprises:
generating a number of fill frames equal to a value of the number of consecutive bad frames; and
storing the fill frames in the audio queue.

5. The method of claim 1, further comprising:
determining if the inter-arrival time of a packet is greater than a value stored in the worst-case jitter register, wherein if the inter-arrival time of the packet is greater than the value stored in the worst-case jitter register,
setting the value stored in the worst-case jitter register to the value of the inter-arrival time of the packet,
multiplying the value stored in the worst-case jitter register by a decay factor and storing in the worst case jitter register;
determining if the value stored in the worst-case jitter register is greater than physical depth of the audio queue, wherein if the value stored in the worst-case jitter register is greater than physical depth of the audio queue,
setting the value stored in the worst-case jitter register to the physical depth of the audio queue; and
computing the target output audio queue depth to be equal to a quotient of the value of the worst-case jitter buffer divided by the audio frame size, plus one.

6. A non-transitory computer-readable medium storing instructions for controlling a computing device for controlling a Voice over Internet Protocol (VoIP) decoder in a communication device, the instructions comprising:
determining if a packet has been received, and if a packet has been received,
determining if a receive error has occurred, and if a receive error has not occurred,
setting a counter that counts a number of sequential bad frames to a value of zero;
decoding the received packet; and
sending the decoded packet to an audio queue for presentation to a user of the communication device,
wherein if the receive error is a timeout error and if a timeout error is determined to have occurred, the instructions further comprise:
determining if comfort noise is being generated, wherein if comfort noise is being generated,
resetting a bad frame counter to zero; and
comparing an output audio queue depth to a target output audio queue depth, wherein if the output audio queue depth is less than the target output audio queue depth, generating a comfort noise frame, otherwise no comfort noise frame is generated,
wherein if comfort noise is not being generated, the instructions further comprise:
comparing an output audio queue depth to a minimum output audio queue depth, wherein if the output audio queue depth is equal to or less than the minimum output audio queue depth,
determining if a consecutive bad frame counter is less than a maximum number of consecutive bad frames allowed, wherein if the consecutive bad frame counter is less than the maximum number of consecutive bad frames allowed,
generating a fill frame;
storing the fill frame in the audio queue; and
incrementing the consecutive bad frame counter.

7. The non-transitory computer-readable medium of claim 6, wherein if the consecutive bad frame counter is not less than the maximum number of consecutive bad frames allowed, the instructions further comprise:
generating comfort noise frames; and
resetting the consecutive bad frame counter to zero.

8. The non-transitory computer-readable medium of claim 6, wherein the receive error is a mismatched sequence number error and if a mismatched sequence number error is determined to have occurred, the instructions further comprise:
determining a number of consecutive frames lost, wherein if the number of consecutive frames lost is equal to one,
determining is a previous frame had a timeout error wherein if the previous frame did not have a timeout error,
generating a fill frame; and
storing the fill frame in the audio queue.

9. The non-transitory computer-readable medium of claim 8, wherein if the number of consecutive bad frames lost is more than one but not greater than three, the instructions further comprise:
generating a number of fill frames equal to a value of the number of consecutive bad frames; and
storing the fill frames in the audio queue.

10. The non-transitory computer-readable medium of claim 6, further comprising:
determining if the inter-arrival time of a packet is greater than a value stored in the worst-case jitter register, wherein if the inter-arrival time of the packet is greater than the value stored in the worst-case jitter register,
setting the value stored in the worst-case jitter register to the value of the inter-arrival time of the packet,
multiplying the value stored in the worst-case jitter register by a decay factor and storing in the worst case jitter register;
determining if the value stored in the worst-case jitter register is greater than physical depth of the audio queue, wherein if the value stored in the worst-case jitter register is greater than physical depth of the audio queue,
setting the value stored in the worst-case jitter register to the physical depth of the audio queue; and
computing the target output audio queue depth to be equal to a quotient of the value of the worst-case jitter buffer divided by the audio frame size, plus one.

11. A Voice over Internet Protocol (VoIP) decoder controller that controls VoIP decoding in a communication device, comprising:
an audio queue;

a controller that determines if a packet has been received, and if a packet has been received, the controller determines if a receive error has occurred, and if a receive error has not occurred, the controller sets a counter that counts a number of sequential bad frames to a value of zero; and a speech decoder that decodes the received packet, wherein the controller sends the decoded packet to the audio queue for presentation to a user of the communication devices, wherein if the receive error is a timeout error and if the controller determines that a timeout error has occurred, the controller determines if comfort noise is being generated, wherein if the controller determines that the comfort noise is being generated, the controller resets a bad frame counter to zero, and compares an output audio queue depth to a target output audio queue depth, wherein if the output audio queue depth is less than the target output audio queue depth, the controller generates a comfort noise frame, otherwise the controller does not generate a comfort noise frame, wherein if comfort noise is not being generated, the controller compares an output audio queue depth to a minimum output audio queue depth, wherein if the controller determines that the output audio queue depth is equal to or less than the minimum output audio queue depth, the controller determines if a consecutive bad frame counter is less than a maximum number of consecutive bad frames allowed, wherein if the controller determines that the consecutive bad frame counter is less than the maximum number of consecutive bad frames allowed, the controller generates a fill frame, stores the fill frame in the audio queue, and increments the consecutive bad frame counter.

12. The VoIP decoder controller of claim 11, wherein if the controller determines that the consecutive bad frame counter is not less than the maximum number of consecutive bad frames allowed, the controller generates comfort noise frames, and resets the consecutive bad frame counter to zero.

13. The VoIP decoder controller of claim 11, wherein if the receive error is a mismatched sequence number error and if the controller determines that a mismatched sequence number error has occurred, the controller determines a number of consecutive frames lost, wherein if the number of consecutive frames lost is equal to one, the controller determines if a previous frame had a timeout error, wherein if the controller determines that previous frame did not have a timeout error, the controller generates a fill frame, and stores the fill frame in the audio queue.

14. The VoIP decoder controller of claim 13, wherein if the controller determines that the number of consecutive bad frames lost is more than one but not greater than three, the controller generates a number of fill frames to be equal to a value of the number of consecutive bad frames, and stores the fill frames in the audio queue.

15. The VoIP decoder controller of claim 11, wherein the controller determines if the inter-arrival time of a packet is greater than a value stored in the worst-case jitter register, wherein if the controller determines that the inter-arrival time of the packet is greater than the value stored in the worst-case jitter register, the controller sets the value stored in the worst-case jitter register to the value of the inter-arrival time of the packet, multiplies the value stored in the worst-case jitter register by a decay factor and stores in the worst case jitter register; determines if the value stored in the worst-case jitter register is greater than physical depth of the audio queue, wherein if the controller determines that the value stored in the worst-case jitter register is greater than physical depth of the audio queue, the controller sets the value stored in the worst-case jitter register to the physical depth of the audio queue, and computes the target output audio queue depth to be equal to a quotient of the value of the worst-case jitter buffer divided by the audio frame size, plus one.

* * * * *